United States Patent [19]
Catano et al.

[11] Patent Number: 5,394,017
[45] Date of Patent: Feb. 28, 1995

[54] CIRCUIT FOR SUSTAINING OUTPUT POWER DURING INPUT POWER INTERRUPTION

[75] Inventors: Albert J. Catano, Sunrise; Richard Alaburda, Boca Raton, both of Fla.

[73] Assignee: AlliedSignal Inc., Morristownship, Morris County, N.J.

[21] Appl. No.: 984,811

[22] Filed: Dec. 2, 1992

Related U.S. Application Data

[63] Continuation-in-part of Ser. No. 942,472, Sep. 9, 1992, which is a continuation of Ser. No. 788,400, Nov. 5, 1991.

[51] Int. Cl.6 ............................................. H02M 3/335
[52] U.S. Cl. .......................................... 307/66; 363/21
[58] Field of Search ........................... 307/564, 64, 66; 323/282, 299, 20, 21, 60, 62, 78

[56] References Cited

U.S. PATENT DOCUMENTS

| | | | |
|---|---|---|---|
| 4,350,027 | 7/1985 | Berger | 361/92 |
| 4,593,213 | 6/1986 | Vesce | 307/564 |

Primary Examiner—A. D. Pellinen
Assistant Examiner—Jonathan Kaplan
Attorney, Agent, or Firm—Donald B. Paschburg; Howard G. Massung

[57] ABSTRACT

A circuit takes advantage of the voltage square times capacitance function of a capacitor to sustain output power during input power interruption with a smaller energy storage capacitor. The circuit comprises an N channel power MOSFET switch, a voltage blocking diode, an energy storage capacitor, a voltage sensing circuit and a capacitor/diode network to provide a constant MOSFET drive.

10 Claims, 3 Drawing Sheets

CIRCUIT FOR SUSTAINING OUTPUT POWER DURING INPUT POWER INTERRUPTION

CROSS REFERENCE TO RELATED APPLICATIONS

This application is a continuation-in-part of now abandoned U.S. application Ser. No. 942,472, filed on Sep. 9, 1992, which, in turn, is a continuation of now abandoned U.S. application Ser. No. 788,400, filed on Nov. 6, 1991.

BACKGROUND OF THE INVENTION

The present invention relates to circuits wherein input power is interrupted and, more particularly, to a circuit of the type described which sustains output power during said input power interruption.

A circuit for the purposes described is disclosed in U.S. Pat. No. 4,593,213 which issued to Vesce, et al on Jun. 3, 1980. Vesce discloses an electronic device comprising a switched mode power supply and a hold-up circuit. The object of the Vesce device is to transfer high voltage energy stored in a low capacitance bank to a low voltage bus, with minimum electrical disturbance, using a current-limited MOSFET switch. The power supply includes a hold-up series diode and a pulse width modulated power switch. The power supply receives primary input power. The hold-up circuit includes a high voltage energy storage capacitor bank and a hold-up transfer switch. The switch transfers high voltage energy stored in the storage capacitor bank to the low voltage bus of the power supply upon receiving an enable signal from a hold-up enable circuit. The hold-up transfer switch includes a zener diode, a resistor, a P-channel power MOSFET switch, and a diode. The Vesce device wastes energy in the disclosed switch because the switch is not operated in its saturation region. The Vesce device also requires an extra diode which further increases the losses in the circuit.

SUMMARY OF THE INVENTION

The present invention contemplates a circuit for sustaining output power during input power interruption. The circuit takes advantage of the fact that the energy stored in a capacitor is equal to one-half of the capacitance of the capacitor multiplied by the square of the voltage across the capacitor to achieve the desired result with a physically smaller energy storage capacitor. The circuit includes an N-channel power MOSFET switch, a voltage blocking diode, an energy storage capacitor, a voltage sensing circuit and a capacitor/diode network to provide a constant MOSFET drive. The output of the circuit is applied to a DC/DC converter section of a power supply.

DETAILED DESCRIPTION OF THE INVENTION

Figure 1:
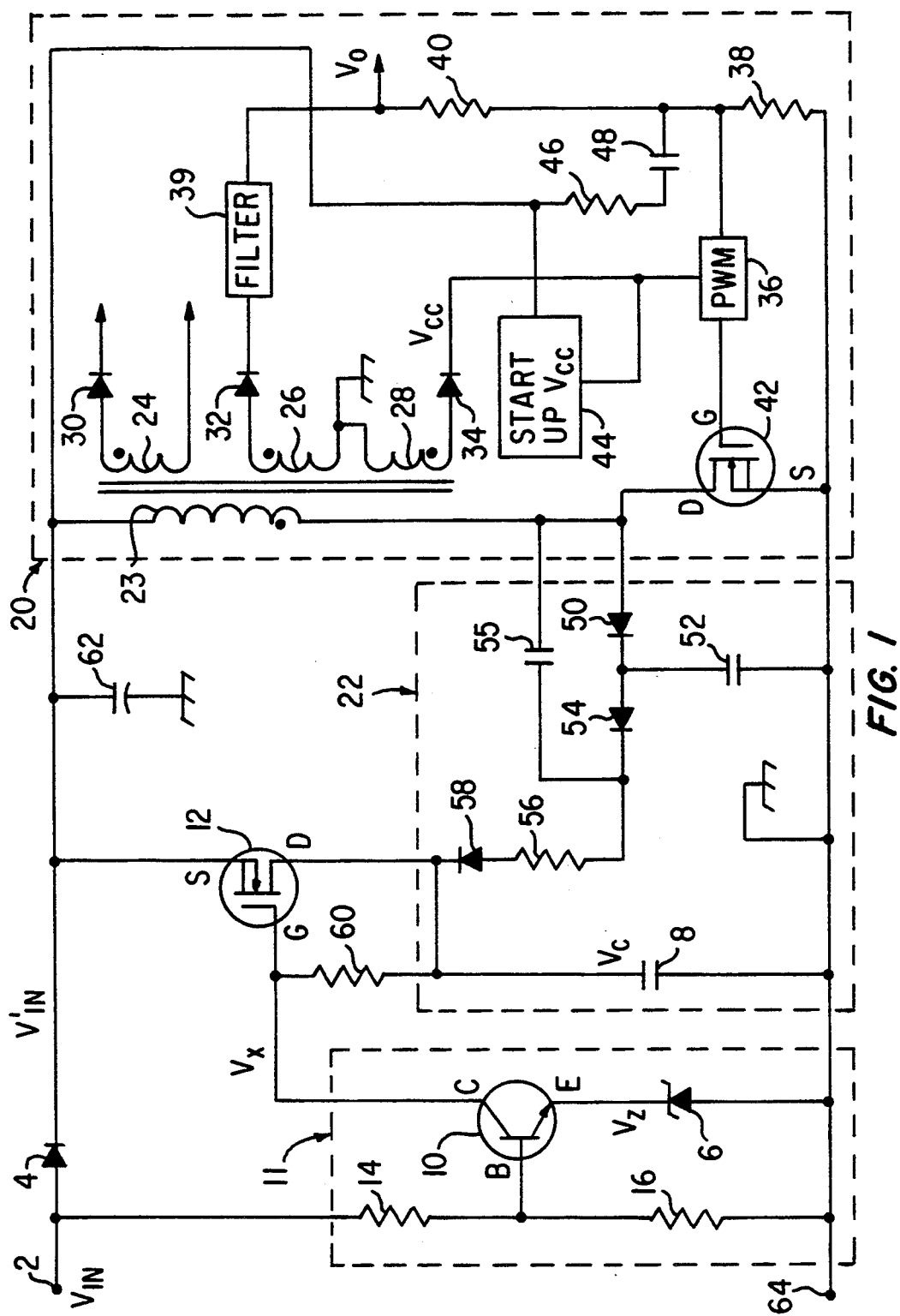
FIG. 1 is an electrical schematic diagram illustrating one embodiment of the present invention.

With reference to FIG. 1, under normal operating conditions, an aircraft's auxiliary power unit (APU) provides, for example, a 28 volt DC voltage $V_{IN}$ at a power input terminal 2 in the range of $V_{IN\,MIN}$ at the low end, $V_{IN\,MAX}$ at the high end and $V_{IN}$ at the nominal level. Normally, $V_{IN}$ is larger than $V'_{IN}$, which is the DC voltage after a blocking diode 4, by the forward voltage drop across blocking diode 4. $V'_{IN}$ is larger than an avalanche voltage $V_Z$ across a zener diode 6, and a voltage $V_C$ across an energy storage capacitor 8 is larger than $V_{IN}$. In this regard, it will be appreciated that the energy stored in a capacitor is equal to one-half of the capacitance of the capacitor times the square of the voltage across the capacitor. The physical size of a capacitor is generally proportional to its capacitance times a DC voltage rating product. Thus, to maximize the stored energy of a capacitor while minimizing its physical size, the voltage across the capacitor is maximized.

Under these conditions, an NPN bipolar transistor 10, located within an input power sensing circuit 11, is kept in the "ON" state via a divider circuit including resistors 14 and 16. The collector (C) of transistor 10 is then at a potential $V_X$, where $V_X = V_Z + V_{CE}$. $V_{CE}$ is the collector (C) to emitter (E) voltage across transistor 10. The gate terminal (G) of an N channel enhancement MOSFET 12 is also at the $V_X$ potential and the source terminal (S) of the MOSFET is at the $V'_{IN}$ potential.

The gate-to-source voltage across MOSFET 12 is equal to $V_X$ minus $V'_{IN}$, but since $V'_{IN}$ is larger than $V_X$, the gate-to-source voltage is negative and MOSFET 12 is in the "OFF" state. Energy storage capacitor 8 is kept charged to a potential $+V_C$, the steady state charge.

This steady state charge is provided via circuits 20 and 22. Circuit 20 is a DC/DC converter circuit and circuit 22 is a voltage doubler/snubber circuit.

Circuit 20 includes basic flyback DC/DC converter circuitry, having a primary winding 23 and three secondary windings 24, 26 and 28, connected to rectifier diodes 30, 32 and 34, respectively. Two of the windings such as 24 and 26 are used to generate output voltages, while the third winding 28 is used as a bootstrap to provide a voltage $V_{CC}$ to a pulse width modulator (PWM) 36 during normal operation, i.e. after the DC/DC converter starts operating, overriding $V_{cc}$ start-up.

Output voltage $V_O$ is the primary regulated output power. Feedback is accomplished via resistors 38 and 40. Resistor 40 is connected to diode 32 via a filter 39. For purposes of simplification, the frequency compensation of the internal error amplifier of PWM 36 has not been shown, although the same will be understood by those skilled in the art.

PWM 36 drives a switching MOSFET 42 directly. A start-up $V_{CC}$ circuit, which can be any arrangement for generating voltage $V_{CC}$ from $V'_{IN}$ to start PWM 36 during power-up, is designated by the numeral 44. Secondary winding 28 of circuit 20 and its associated rectifier diode 34 are included to override the start-up $V_{CC}$, since circuits for this purpose are often too inefficient to provide $V_{CC}$ during normal operation. Resistor 46 and capacitor 48 provide feedforward to the internal error amplifier of PWM 36 to minimize output transients during power interrupts when $V'_{IN}$ jumps from $V_{IN}$ (minus a diode drop) to $V_C$ as will be hereinafter explained and as particularly illustrated in FIG. 3.

Circuit 22 is referred to as a voltage doubler/snubber circuit because it snubs the peak voltages that occur when switching current through an inductor, and virtually doubles the switched voltage that appears at gate (G) of MOSFET 42. Snubbing is often necessary in switched converters to insure that the maximum allowable drain-to-source voltage of the MOSFET is not exceeded. Snubbing of the drain voltage of MOSFET 42 is achieved mainly by a diode 50 and a capacitor 52, although it will be appreciated that all components in circuit 22 are involved to some degree in the snubbing action.

As to the voltage "doubling" action, the switched voltage that appears at the drain (D) of MOSFET 42 is rectified by diode 50 and a DC voltage is created across capacitor 52. The voltage at the cathode of a diode 54 is a superposition of the voltage across capacitor 52 (minus a diode drop) and the AC coupled voltage at the drain (D) of MOSFET 42. A capacitor 55 is connected in parallel with diodes 54 and 50.

Storage capacitor 8 charges to the peak voltage at the cathode of diode 54 via resistor 56 and diode 58. The energy stored in capacitor 8 is the energy used to supply the input to DC/DC converter circuit 20 during a primary power interruption. Therefore, the voltage doubler/snubber circuit snubs the drain voltage of MOSFET 42 while peak charging storage capacitor 8 to a voltage above $V_{IN}$.

The current through a resistor 60 is determined by $+V_C$ minus $V_X$ divided by the resistance of resistor 60.

Power is normally provided to DC/DC converter 20 by blocking diode 4. Upon a power interruption, divider circuit 14/16 senses that $V_{IN}$ is falling below $V_{IN\ MIN}$ and allows transistor 10 to turn OFF. The collector (C) of transistor 10 goes to a high impedance mode. As gate (G) of MOSFET 12 is released from the $V_X$ potential, current starts to flow from $+V_C$ through resistor 60, charging the gate (G) to source (S) capacitance of MOSFET 12. As the gate to source voltage approaches a threshold, MOSFET 12 starts to partially conduct and dumps the energy stored in energy storage capacitor 8. If said gate to source voltage tries to go higher than the threshold, MOSFET 12 conducts more, therefore reducing the drain to source voltage and, as a consequence, reducing the gate to source voltage, which in turn causes MOSFET 12 to conduct less. The net effect is that MOSFET 12 conducts just enough to maintain its gate to source voltage equal to the threshold. This limits the amount of current which is discharged from energy storage capacitor 8.

The loss of input power is determined by circuit 11 which includes divider circuit 14/16, transistor 10 and zener diode 6. An input capacitor 62 provides filtering to the switching currents of DC/DC converter 20. A return for the DC voltage supplied by the aircraft's auxiliary power unit is at a return terminal 64.

The configuration of the invention shown and described with reference to FIG. 1 is such that when MOSFET 12 is partially conducting, it is dissipating power that otherwise would be transferred to the output by DC/DC converter 20. Therefore, energy storage capacitor 8 has to be designed to store more energy than necessary to account for the losses incurred by MOSFET 12.

Figure 2:
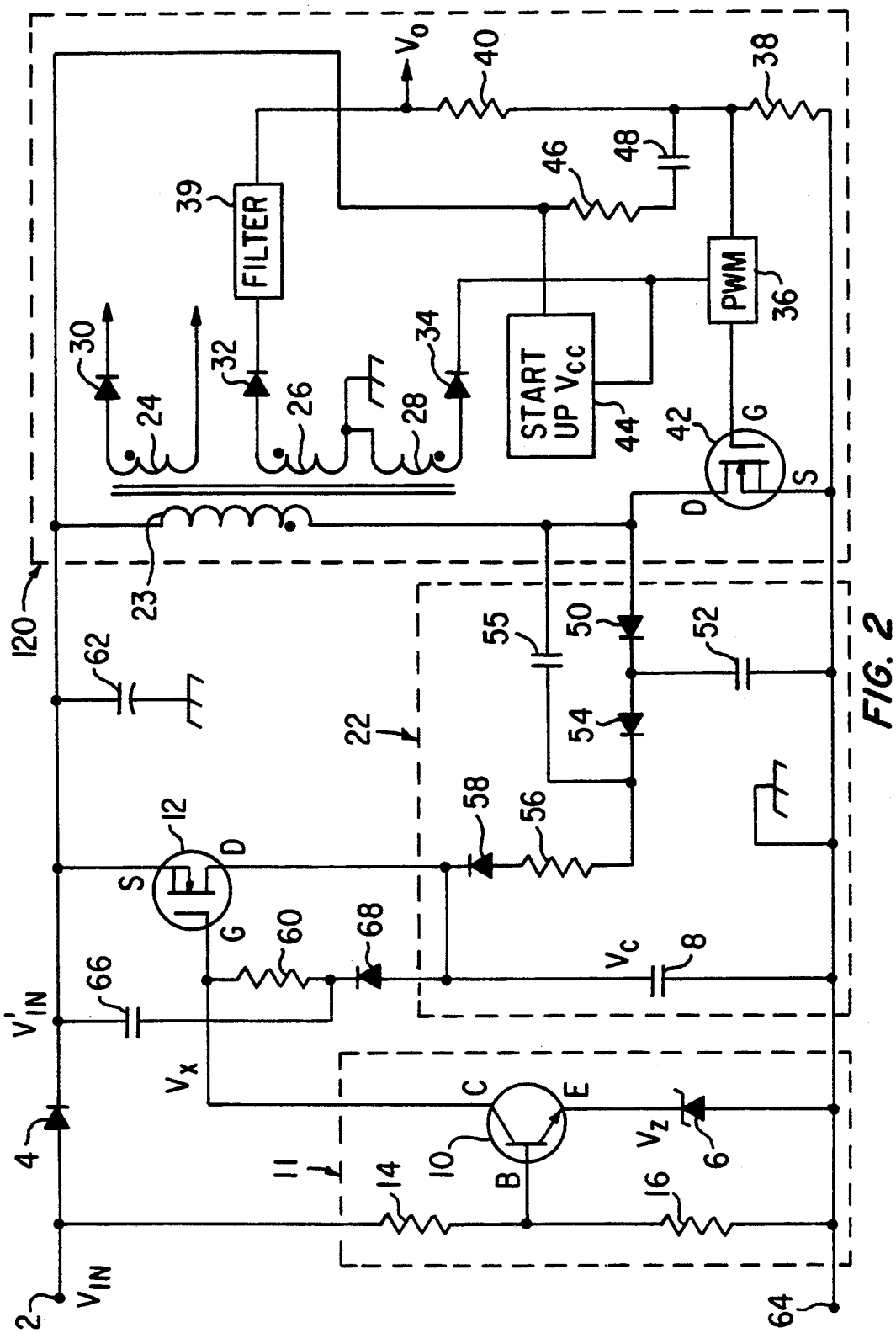
FIG. 2 is an electrical schematic diagram illustrating an alternate embodiment of the present invention.

FIG. 2 illustrates an embodiment of the invention which avoids this power dissipation.

With reference then to FIG. 2, wherein components corresponding to those in FIG. 1 carry corresponding numerical designations, power is provided to DC/DC converter 20 by means of blocking diode 4 and the circuit of FIG. 2 operates in a manner such as the circuit of FIG. 1 as heretofore described. In order to overcome the aforementioned power dissipation, a capacitor 66 and a diode 68 are utilized to modify the gate to source voltage of MOSFET 12. Capacitor 66 is allowed to charge to the difference between $+V_C$ minus the voltage drop across diode 68 minus $V'_{IN}$.

Figure 3:
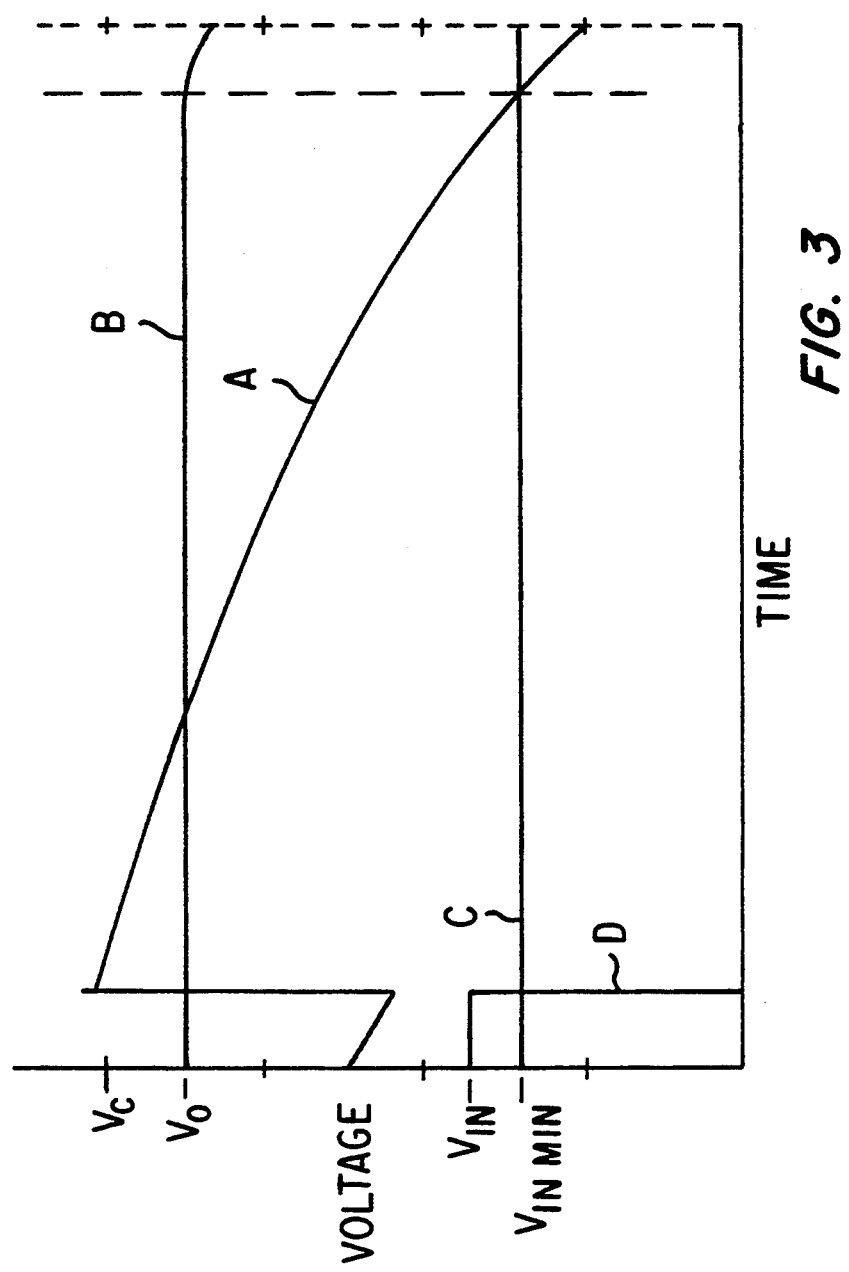
FIG. 3 is a graphical representation illustrating the results of a simulation of one embodiment of the present invention.

FIG. 3 illustrates the results of a simulation of a preferred embodiment of the present invention.

Curve D tracks input power ($V_{IN}$) which enters the circuit of the invention at power input 2.

Curve C shows the minimum $V_{IN}$ level ($V_{IN\ MIN}$) required by DC/DC converter 20 in order to provide regulated outputs.

Curve B is output $V_O$ and indicates that there is no output power interruption prior to or during the input power interruption. Curve B also indicates that the output power drops only after $V_{IN}$ (curve A) falls below $V_{IN\ MIN}$ (Curve C).

Curve A indicates that as MOSFET 12 is turned fully ON, $V'_{IN}$ jumps from its voltage prior to the input power interruption to voltage $+V_C$ stored in energy storage capacitor 8.

With the above description of the invention in mind, reference is made to the claims appended hereto for a definition of the scope of the invention.

What is claimed is:

1. A circuit for sustaining output power during input power interruption, comprising:
    an input terminal for receiving an input voltage;
    first current flow control means connected to the input terminal for providing a voltage at a level lower than the input voltage, said first current flow control means including a blocking diode, with the voltage provided by the blocking diode being at a level lower than the input voltage by the forward voltage drop across the blocking diode;
    first means for sensing the input voltage and including a voltage divider connected to the input terminal and second current flow control means connected to the voltage divider and maintained in an "on" state;
    third current flow control means connected to the first current flow control means and to the second current flow control means so as to be rendered in an "off" state;
    second means connected to the third current flow control means and including energy storage means, said energy storage means being a capacitor, with the energy stored in the capacitor being equal to one-half of the capacitance of the capacitor times the square of the voltage across said capacitor, and the size of said capacitor being directly proportional to said capacitance times a DC voltage rating product, whereby the energy stored in the capacitor is maximized and the size of said capacitor is minimized, and the voltage across the capacitor is maximized;
    third means connected to the first current flow control means and including fourth current flow control means connected to the second means, whereby the energy storage means in the second means stores a peak voltage for application to the third means during an interruption of the input voltage, said third means providing a primary regulated output voltage;
    a return terminal;
    the voltage divider in the first means including a first resistor connected to the input terminal and a second resistor connected to the first resistor and to the return terminal;

the second current flow control means connected between the first and second resistors;

a fifth current flow control means connected to the second current flow control means and to the return terminal, said fifth current flow control means being a zener diode and the voltage provided by the first current flow control means being larger than the avalanche voltage across said zener diode;

the second current flow control means being an NPN bipolar transistor having base, collector and emitter elements;

the base element is connected between the first and second resistors, the collector element is connected to the third current flow control means and the emitter element is connected to the zener diode;

the collector element being at a voltage which is the difference between the avalanche voltage across the zener diode and the collector element to emitter element voltage across the NPN bipolar transistor, whereby the NPN bipolar transistor is maintained in the "on" state;

the third current flow control means is an N channel enhancement MOSFET having source, gate and drain elements;

the source element is connected to the blocking diode, the gate element is connected to the collector element of the NPN bipolar transistor and the second means is connected to the drain element;

the gate element is at the NPN transistor collector voltage, the source element is at the voltage provided by the blocking diode, and the gate to source voltage is equal to the NPN transistor collector voltage minus the blocking diode voltage;

said gate to source voltage being in a negative sense, since the blocking diode voltage is larger than the NPN transistor collector voltage, whereby said N channel enhancement MOSFET is in the "off" state; and means connected to the blocking diode, to the energy storage capacitor and to the N channel enhancement MOSFET for minimizing power dissipation when said N channel enhancement MOSFET is conducting.

2. A circuit as described by claim 1, wherein:

the second and third means are effective for keeping the energy storage capacitor charged to a steady state charge.

3. A circuit as described by claim 1, wherein the third means includes:

a primary winding connected to the blocking diode and three secondary windings inductively coupled to the primary winding;

each of the secondary windings having a rectifying means associated therewith;

two of the secondary windings cooperating with their associated rectifying means for providing output voltages;

the third of the secondary windings and its associated rectifying means cooperating to provide a bootstrap output;

a pulse width modulator connected to the rectifying means associated with the third secondary winding; and switching means connected to the pulse width modulator and driven by said pulse width modulator in response to the primary regulated output.

4. A circuit as described by claim 3, including:

start-up means connected to the pulse width modulator and providing an output to start said pulse width modulator during circuit power-up.

5. A circuit as described by claim 4, including:

the associated rectifying means associated with the third secondary winding connected to the start-up means for overriding the output provided by said start-up means.

6. A circuit as described by claim 3, wherein:

the switching means is a switching MOSFET having gain, source and drain elements;

the drain element is connected to the second means and the primary winding, the gate element is connected to the pulse width modulator and the source element is connected to the return terminal; and said second means is connected to the switching MOSFET and includes means for snubbing the peak voltage appearing at the drain element of the switching MOSFET, and means for doubling the voltage appearing at the drain element of said switching MOSFET.

7. A circuit as described by claim 1, wherein:

the second means includes means connected to the energy storage capacitor for peak charging said capacitor to the voltage above the input voltage.

8. A circuit as described by claim 1, wherein:

the first and second means include means cooperatively effective for controlling said N channel enhancement MOSFET to conduct just enough to maintain its gate to source voltage equal to a threshold for limiting the amount of current discharged from the energy storage capacitor in the second means.

9. A circuit as described by claim 1, wherein said means connected to the blocking diode, to the energy storage capacitor and to the N channel enhancement MOSFET includes:

a capacitor connected to the output of the blocking diode;

a diode connected to the capacitor, to the energy storage capacitor and to the N channel enhancement MOSFET; and said capacitor charging to the difference between the voltage across the energy storage capacitor minus the voltage drop across said diode, minus the voltage provided by the blocking diode.

10. A circuit as described by claim 1, including:

a filter capacitor connected between the first current flow control means and the third means.

* * * * *